UNITED STATES PATENT OFFICE.

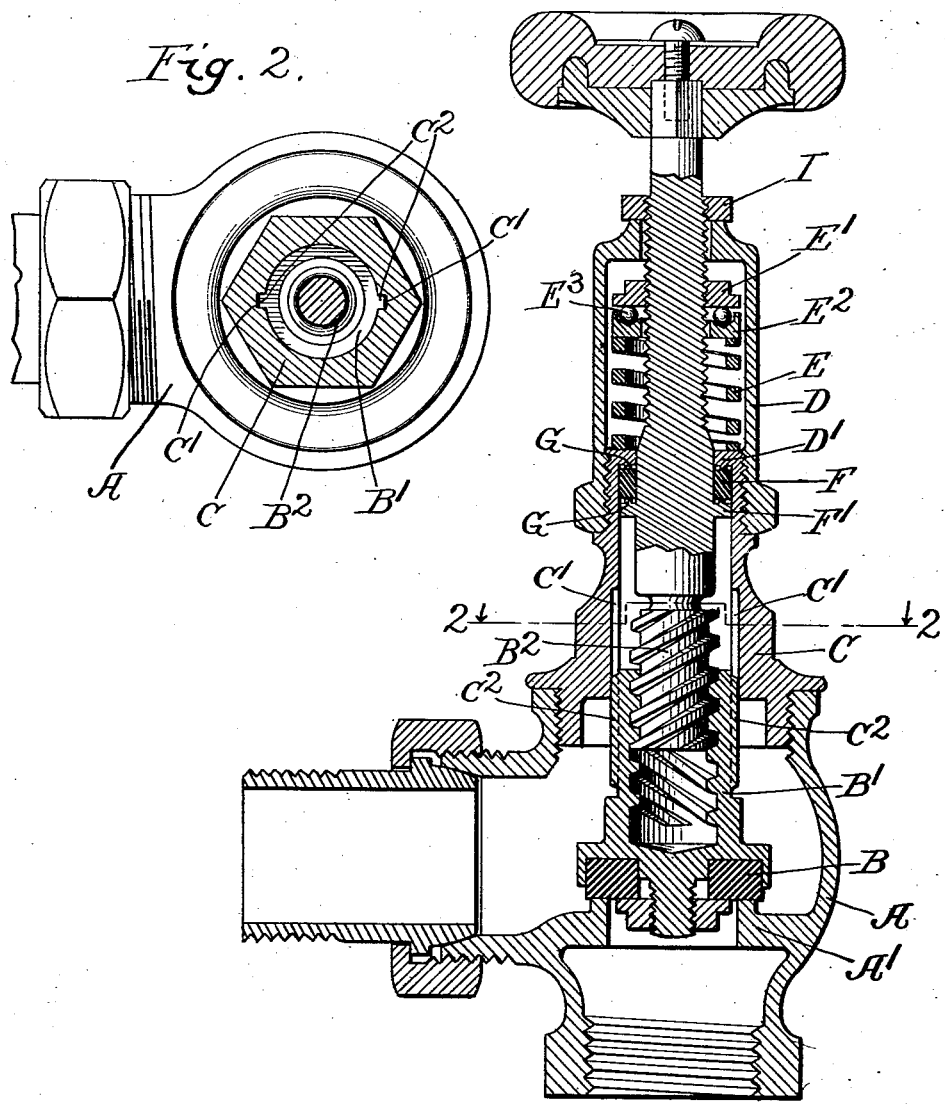

EVERETT P. ALLEN, OF CHICAGO, ILLINOIS; MARY A. ALLEN, EXECUTRIX OF SAID EVERETT P. ALLEN, DECEASED, ASSIGNOR TO DOLE VALVE COMPANY, OF CHICAGO, ILLINOIS, A CORPORATION OF ILLINOIS.

VALVE.

1,050,509.        Specification of Letters Patent.        Patented Jan. 14, 1913.

Application filed March 1, 1906. Serial No. 303,572.

*To all whom it may concern:*

Be it known that I, EVERETT P. ALLEN, a citizen of the United States, residing at Chicago, in the county of Cook and State of Illinois, have invented a certain new and useful Improvement in Valves, of which the following is a specification.

My invention relates to improvements in valves, and has for its object to provide a new and improved device of this description.

My invention is illustrated in the accompanying drawings, wherein—

Figure 1 is a sectional view through a valve embodying my invention; Fig. 2 is a sectional view taken on line 2—2 of Fig. 1.

Like letters refer to like parts throughout the several figures.

In the drawing I have shown a valve embodying my invention adapted to be used as an admission valve for steam radiators and the like. In this construction I have shown the valve body A containing the valve seat $A^1$. The seat engaging part B which engages the seat to close the opening is connected with a projecting part $B^1$ which, as herein shown, is hollow and is provided with an internal screw thread engaged by the threaded end $B^2$ of the valve stem. The projecting part $B^1$ when the valve stem is rotated slides up and down in the guiding part C. This guiding part may be of any suitable construction, and, as herein shown, is a part of the valve casing. This guiding part is preferably provided with grooves $C^1$ into which fit projecting guides $C^2$ on the projecting part $B^1$, thus preventing the said part $B^1$ from rotating when the stem is rotated. A sleeve D surrounds the valve stem and is attached to the guiding part C. Within the sleeve D is a spring E which engages a stationary part $D^1$ associated with the valve casing. The pressure of the spring may be regulated by means of a nut $E^1$ working on a threaded part of the valve stem. This nut may directly engage the spring, or a ball bearing arrangement may be provided by using a ring $E^2$ which engages the spring and which is provided with a groove containing a series of balls $E^3$. Associated with the valve stem is a composition disk F of any suitable material, which is engaged on one side by a disk holder $F^1$ attached to the valve stem and on the other side by a stationary part $D^1$ associated with the valve casing. The parts $D^1$ and $F^1$ are preferably provided with annular engaging parts G which engage the opposite sides of the packing ring. It will be seen that the spring E when the nut $E^1$ is tightened exerts a force tending to lift the valve stem. This causes the composition disk F to be tightly gripped between the parts $D^1$ and $F^1$, and hence prevents the steam or other fluid from escaping. It will further be seen that the tension of the spring may be adjusted so as to secure any desired pressure by means of the nut $E^1$, and that a simple, efficient and successful joint is provided which does not interfere with the operation of the valve. A nut I is connected with the valve stem and engages the sleeve D so as to prevent the valve stem being pushed down when the stem is being rotated. When it is desired to open or close the valve, the valve stem is rotated by means of the handpiece at the top. This rotation causes the part B to move up or down depending upon the direction of rotation so as to close or open the valve, and it does not in any manner interfere with the joint.

I have described in detail a particular construction embodying my invention, but it is of course evident that the parts may be varied in form, construction and arrangement without departing from the spirit of my invention, and I therefore do not limit myself to the particular construction and arrangement shown.

I claim:

1. A valve comprising a casing made up of three separable sections, a valve stem, a part on the valve stem and a stationary part, a composition disk between them, a spring surrounding the valve stem engaging at one end said stationary part and at the other end an engaging piece on the valve stem so as to clamp the disk between the said two parts, said spring inclosed in one section of the casing, and means for adjusting the tension of said spring so as to vary the clamping pressure.

2. A valve comprising a casing, a rotatable valve stem mounted therein, a seat-engaging part movably connected with the valve stem, a composition disk associated with said stem, two engaging parts therefor one on the stem and the other attached to the casing, a spring for forcing said two parts toward each other to clamp the disk, means for adjusting said spring independent of said seat-engaging part, said means contained within the casing so as to be inaccessible when the parts are in position.

3. A valve comprising a casing, a rotatable valve stem mounted therein, a seat-engaging part movably connected with the valve stem, a composition disk associated with said stem, two engaging parts therefor one on the stem and the other attached to the casing, a spring for forcing said two parts toward each other to clamp the disk, means for adjusting said spring independent of said seat-engaging part, said means contained within the casing so as to be inaccessible when the parts are in position, and a device for preventing longitudinal movement of the stem.

4. A valve comprising a casing, a rotatable stem therein, a composition disk surrounding said stem, two parts between which said composition disk is clamped, one part on the stem and the other on the casing, a spring surrounding said stem engaging at one end a part associated with the casing and at the other end a ball bearing cup surrounding the stem but loose thereon, a nut screw threaded on the stem opposed to the ball bearing cup, and balls in said cup engaged by said nut.

5. A valve comprising a casing, a rotatable stem therein, a composition disk surrounding said stem, two parts between which said composition disk is clamped, one part on the stem and the other on the casing, a spring surrounding said stem engaging at one end a part associated with the casing and at the other end a ball bearing cup surrounding the stem but loose thereon, a nut screw threaded on the stem opposed to the ball bearing cup, balls in said cup engaged by said nut, and a limiting device on the stem adapted to engage the casing so as to prevent longitudinal movement of the stem.

6. A valve comprising a casing, a rotatable stem therein, opposed seating parts, one on the stem and one fixed in position, a spring surrounding said stem engaging at one end a part associated with the casing, a ball bearing cup engaged by the other end of said spring and surrounding said stem but loose thereon, a nut screw-threaded on the stem opposed to the ball bearing cup and balls in said cup engaged by said nut, said ball bearing cup inclosed in said casing.

EVERETT P. ALLEN.

Witnesses:
PERCIVAL N. TRUMAN,
EDNA K. REYNOLDS.